(No Model.)
R. VOIT.
Glass Scalloping Machine.
No. 228,495. Patented June 8, 1880.
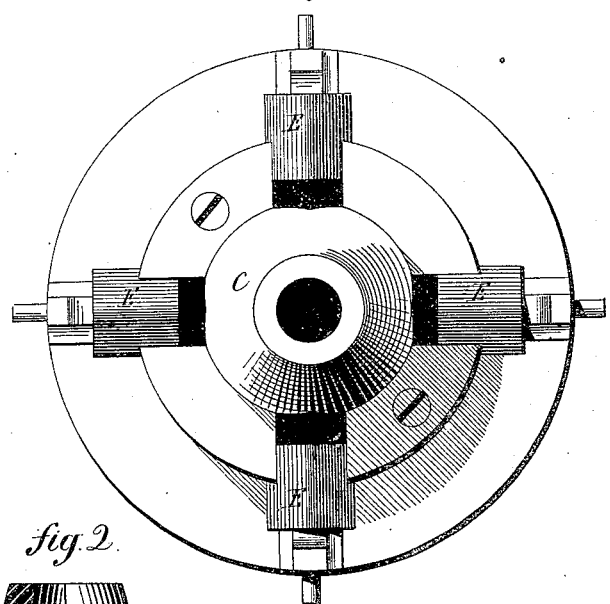
fig. 4
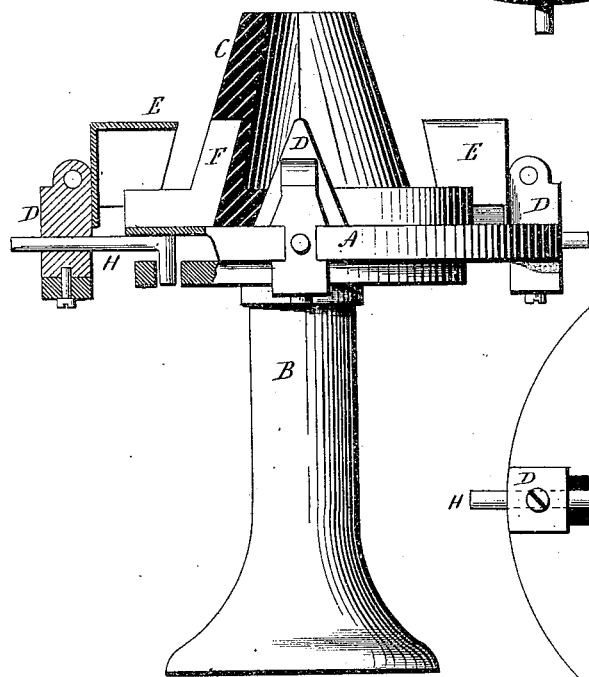
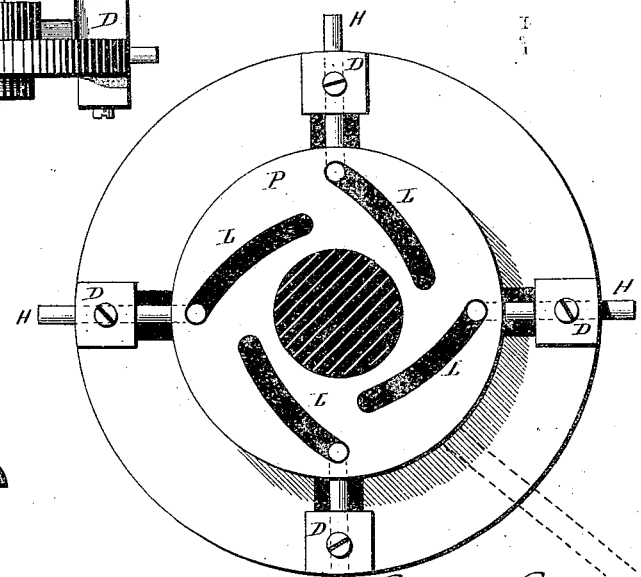
Witnesses:
Reynold Voit
Inventor
By atty

UNITED STATES PATENT OFFICE.

REYNOLD VOIT, OF WEST MERIDEN, CONNECTICUT.

GLASS-SCALLOPING MACHINE.

SPECIFICATION forming part of Letters Patent No. 228,495, dated June 8, 1880.

Application filed April 16, 1880. (No model.)

*To all whom it may concern:*

Be it known that I, REYNOLD VOIT, of West Meriden, in the county of New Haven and State of Connecticut, have invented a new Glass-Scalloping Machine; and I do hereby declare the following, when taken in connection with the accompanying drawings and the letters of reference marked thereon, to be a full, clear, and exact description of the same, and which said drawings constitute part of this specification, and represent, in—

Figure 1, a top view; Fig. 2, a sectional side view; Fig. 3, an under side of bed, looking up; Fig. 4, the cut blank.

This invention relates to a device for aiding in the ornamentation of the edge of glass articles, as by scalloping and like irregularities.

In the manufacture of articles of glass, such as dishes, bowls, vases, &c., the irregular curves or shapes at the edge are produced by hand with no other practical guide than the eye or skill of the workman.

The object of this invention is to construct a machine which will regularly cut and space the edge without the skill required in the usual method; and it consists in the construction as hereinafter described, and particularly recited in the claims.

A is the bed of the machine, arranged upon a suitable stationary post, B. On the center of the bed is placed a cone or frustum of a cone, C, or equivalent shape, which will correspond substantially to the shape of the interior of the blank when in the condition to be gashed or cut. Such a gashed or cut blank is shown in Fig. 4 on a small scale.

On the bed, in suitable guides, several slides, D, are arranged so as to move radially toward and from the cone, each of the slides D carrying a cutter, E. The cutters are preferably of inverted V-shape, (see Fig. 2,) and a corresponding recess, F, is made in the side of the cone, and so that the cutters, when moved forward, will pass into their corresponding recesses F, the edge of the said recesses and the edge of the cutters together producing a shear-cut upon the material placed between the two. These cutters may be more or less in number—here represented as four.

The slides D extend down through the bed, and are each connected by a rod, H, to a corresponding eccentric-slot, L, in the cam P. This cam P is concentric with the cone, and made so as to be rotated by means of a handle extending therefrom, as seen in broken lines, Fig. 3, or otherwise.

When the cutters are out, as seen in Fig. 2, the cam is in the position as seen in Fig. 3. Then by turning the cam the slots L draw the slides, with their respective cutters, toward and into the corresponding recesses in the cone C.

The glass to be cut is drawn into a shape corresponding at its mouth substantially to the shape of the cone, and while hot is placed over the cone and inside the cutters; then the cutters are simultaneously forced forward and cut from the glass pieces corresponding to the cutters.

If the cutters be sufficient in number to make all the cuts required, then the work is done at a single operation; but in practice it is found better that the cutters should be half the number of cuts to be made; hence when the first cut is completed the cutters are withdrawn; then the glass is turned to bring the cuts already made between the cutters and presenting the intermediate uncut portion to the cutters; then a second cut is made, completing the gashing or cutting of the edge. From this time the glass is treated in the usual manner for finishing and completing the irregular or scalloped edge.

By making the recesses in the support C higher up, or distant from the rest for the edge of the glass and corresponding cutters, perforations may be cut through the body of the glass with the same accuracy as the cutting and spacing at the edge.

I claim—

1. The combination of the central support, C, with radially-movable cutters and corresponding recesses in said support, and means for imparting simultaneous movement to the said cutters, substantially as and for the purpose described.

2. The combination of the central support, C, cutters arranged upon radial slides, recesses in said support corresponding to said cutters, and the rotating cam P, provided with segmental slots L, each in connection with one of said slides, substantially as and for the purpose described.

REYNOLD VOIT.

Witnesses:
JOHN E. EARLE,
JOS. C. EARLE.